United States Patent [19]

Jardine et al.

[11] Patent Number: 4,958,125
[45] Date of Patent: Sep. 18, 1990

[54] METHOD AND APPARATUS FOR DETERMINING CHARACTERISTICS OF THE MOVEMENT OF A ROTATING DRILL STRING INCLUDING ROTATION SPEED AND LATERAL SHOCKS

[75] Inventors: Stuart Jardine, Cambridge, England; Dominic McCann, Paris, France; Marc Lesage, Missouri City, Tex.

[73] Assignee: Anadrill, Inc., Sugar Land, Tex.

[21] Appl. No.: 441,683

[22] Filed: Nov. 22, 1989

[30] Foreign Application Priority Data

Dec. 3, 1988 [GB] United Kingdom ............. 8828286

[51] Int. Cl.$^5$ .................. G01P 3/42; G01P 15/00; E21B 47/00
[52] U.S. Cl. .................. 324/162; 73/151; 166/250; 175/40
[58] Field of Search ............ 324/356, 379, 162; 73/151; 166/250; 175/40, 45, 50

[56] References Cited

U.S. PATENT DOCUMENTS 2,985,829  5/1961  Swift .
3,345,867  10/1967  Arps .
3,626,482  12/1971  Quichaud .
4,647,853  3/1987  Cobern .

FOREIGN PATENT DOCUMENTS 2195773  4/1988  United Kingdom .

Primary Examiner—Reinhard J. Eisenzopf
Assistant Examiner—Walter E. Snow
Attorney, Agent, or Firm—John J. Ryberg

[57] ABSTRACT

The invention is related to a method of determininng the instantaneous rotation speed of a drill string or a drill bit in a borehole or the lateral shocks applied to the string or bit. The centripetal acceleration of the drill string is measured at at least two opposite ends of a drill string diameter so as to obtain two centripetal acceleration signals ac1 and ac2; the signals ac1 and ac2 are combined and the instantaneous rotation speed or the lateral shocks are derived from said combined signal. The accelerometers must be of the type delivering a signal with a DC component. An important application of the invention is to transform drill string rotation speed dependent data acquired versus time with a constant sampling time increment $T_c$ separating successive data, into compensated data which would be obtained for a substantially constant drill string rotation speed $S_c$. The compensated data are obtained either by adjusting the constant sampling time interval $T_c$ into a variable sampling time increment $T_v$, using the measured instantaneous rotation speed S, or by selecting the data which have been acquired during periods of time during which the instantaneous rotation speed of the drill string varied within predetermined limits only.

12 Claims, 5 Drawing Sheets

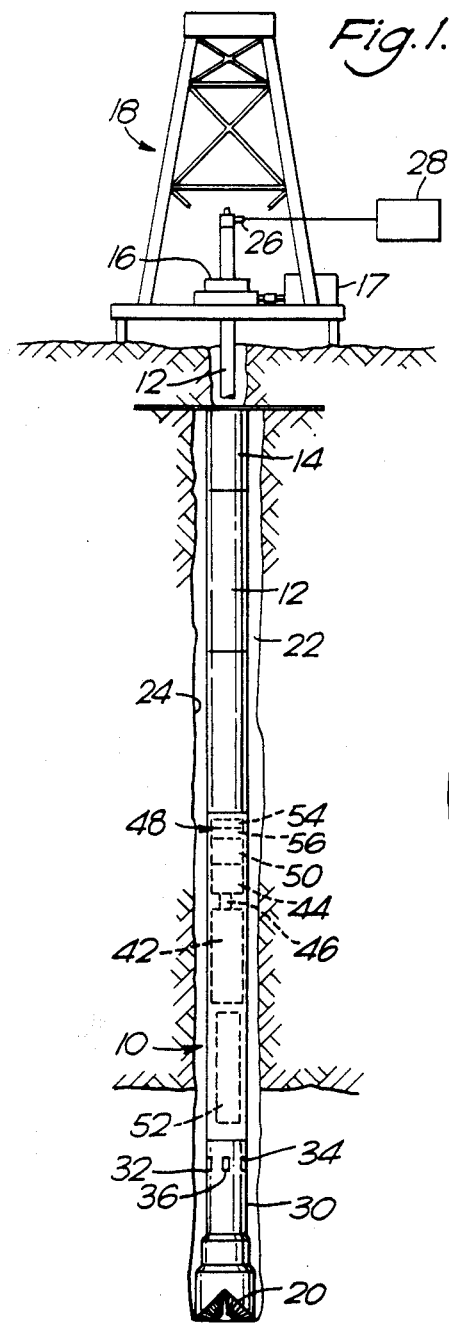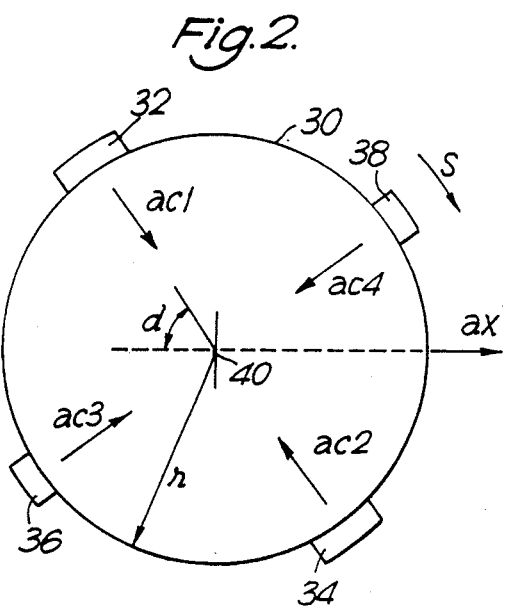

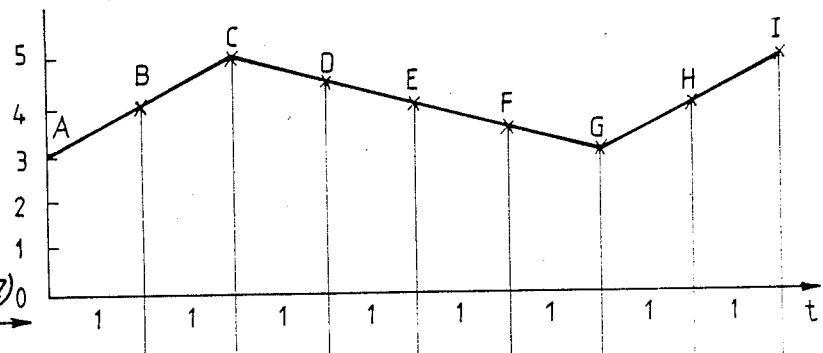
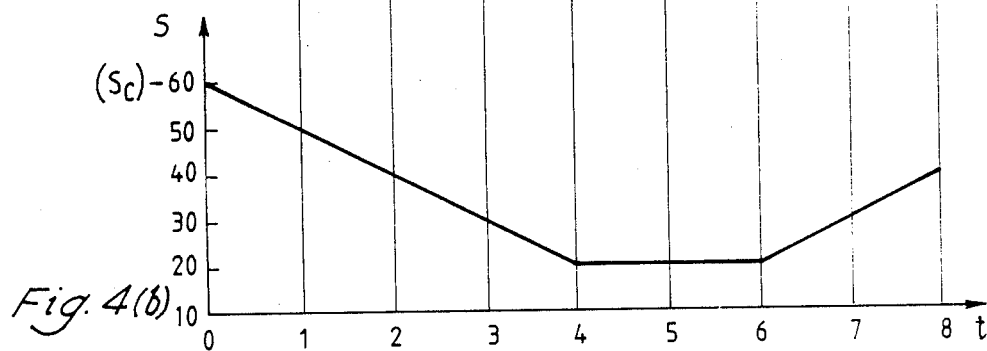
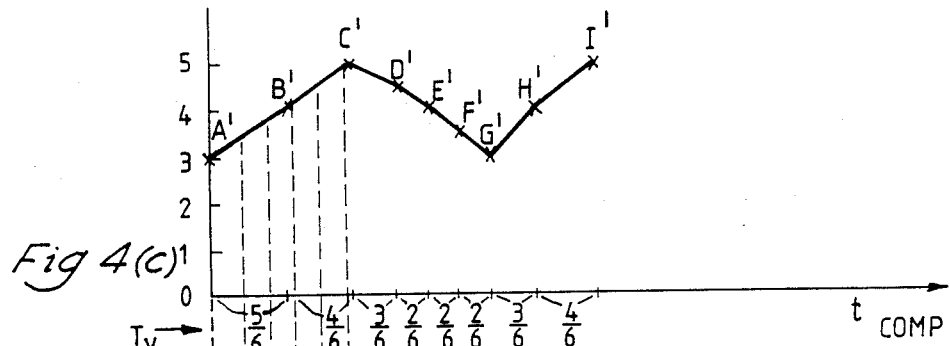
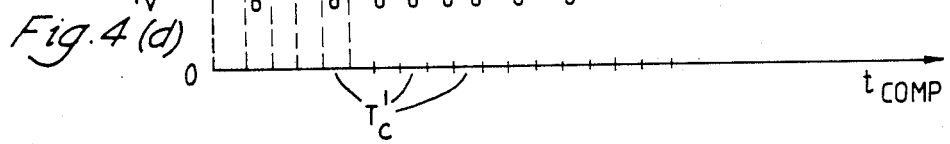

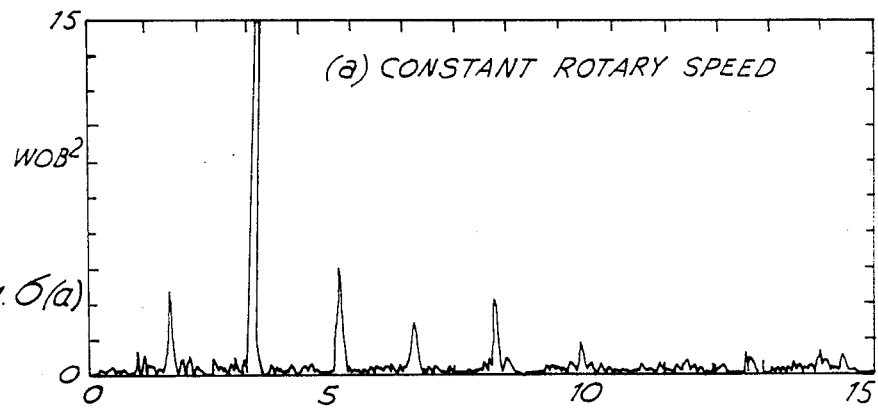
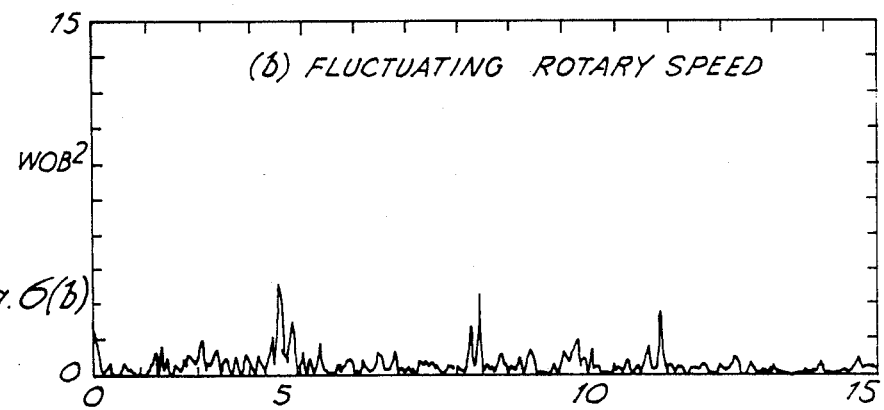
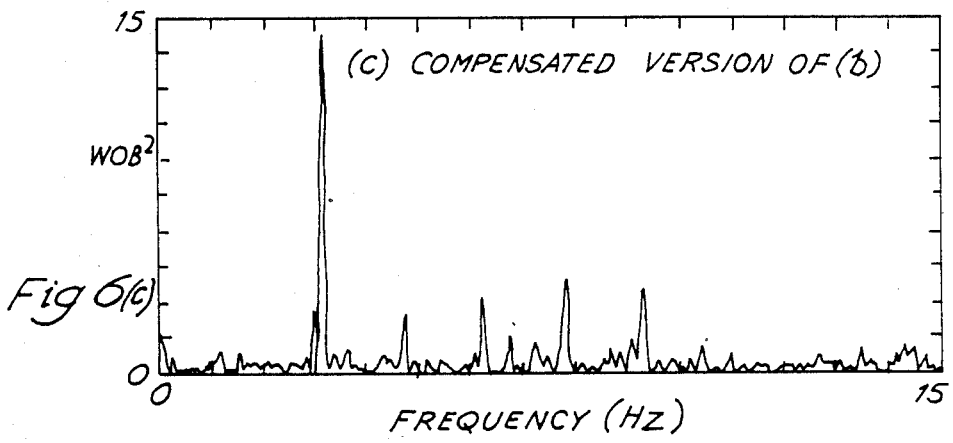

METHOD AND APPARATUS FOR DETERMINING CHARACTERISTICS OF THE MOVEMENT OF A ROTATING DRILL STRING INCLUDING ROTATION SPEED AND LATERAL SHOCKS

The present invention relates to a method of determining at least one characteristic of the movement of a drill string rotating in a borehole, the characteristic being the instantaneous rotation speed of the drill bit and/or the lateral shock acting on the drill string. The invention is particularly useful for determining the instantaneous rotation speed of the drill bit or the drill string, and the lateral shocks acting on it.

To drill a borehole such as for the search of hydrocarbon, a drill string composed mainly of drill pipes and a drill bit, is rotated from the surface. It has been demonstrated that the rotation speed of the drill bit, while drilling, is not constant even when the rotation speed of the drill string at the surface is kept constant, and varies significantly over short time intervals. This is due mainly to the relative elasticity of the drill string, the frictions of the drill string along the wall of the borehole and the hardness of the formation being drilled.

In most of the drilling operations, the drill string is not equipped with downhole measuring apparatus. The average rotation speed of the drill string is then measured at the surface with a shaft encoder and the instantaneous rotation speed of the drill bit is (wrongly) assumed to be the same. However, it is more and more common to incorporate a measurement while drilling apparatus in the drill string immediately above the drill bit. The rotation speed of the drill bit is then measured downhole and the information sent up to the surface by acoustic signals transmitted through the drilling mud present in the borehole.

To measure the rotation speed of a drill string, accelerometers have been used. The parameter which is measured is the torsional acceleration and by double integration the angular displacement of the drill string is determined. Most of the accelerometers which have been used include a piezoelectric crystal which is sensitive to variations of the torsional acceleration only and not to a constant acceleration. This type of accelerometer does not measure the instantaneous rotation speed of the drill string, but only its variation and most often gives only an average of the rotation speed.

In U.S. Pat. No. 3,626,482, accelerometers are used but to measure axial vibrations in the drill string either at the surface or downhole. The accelerometers used (such as reference 31) are piezoelectric (quartz accelerometer) and therefore deliver only AC signals. Acceleration detectors are preferentially used by pairs and disposed on two opposite generatrixes of the measuring section and the electrical signals supplied by these detectors are opposed to one another in a differential amplifier. In this way the signals representing the vibratory state which is being investigated are added while all the signals representing parasitic vibrations are eliminated. The resulting signal is processed and applied to a band pass filter whose mean frequency is a multiple of the speed of rotation.

An attempt has been made in U.S. Pat. No. 2,985,829 to determine the drill bit speed by detecting the vibrations induced in the drill pipe by virtue of the drilling operation. An electrical transducer is used to generate signals proportional to the vibrations induced in the drilling apparatus. These signals are filtered to discard unwanted frequency bands. A signal is formed, the frequency of which corresponding to the rotation of the drill bit.

In these two patents, the rotation speed is not measured directly, but by making vibration measurements, and the result is an average rotation speed.

Magnetometers which sense the intensity of the earth's magnetic field have also been used to monitor the rotation speed of a drill string. These devices are sensitive to metallic masses such as, for example, the casing around the borehole and the drill string itself. Correction of the signals delivered by magnetometers is therefore required, which is detrimental to the accuracy of the measurement. An example is given in U.S. Pat. No. 4,647,853 which describes an apparatus for measuring the speed of rotation of a downhole turbine by the interaction of a triaxial magnetometer in a sensor package and a permanent magnet attached to the turbine shaft.

It is interesting to note that in the methods of the prior art for measuring the drill string or drill bit rotation speed, the signals obtained by the transducers are processed so as to obtain an AC signal, the DC component being discarded by the use of pass band filters centred around frequencies of interest.

In accordance with one object of the present invention, the instantaneous rotation speed of a drill string rotating in a wellbore is measured. The measurement can be made at the surface or downhole with measurement while drilling equipment. Two accelerometers are used, located at the two opposite ends of a drill string diameter. The accelerometers are of the type delivering a DC signal.

Another object of the invention is to measure the amplitude and the direction of lateral shocks on the drill string. For that purpose, four accelerometers delivering DC signals are used, located at the four opposite ends of two perpendicular drill string diameters in the same cross-section of the drill string.

More specifically, the invention is related to a method of determining at least one characteristic of the movement of a rotating drill string in a borehole characterized by measuring the centripetal acceleration of the drill string at at least two opposite ends of a drill string diameter so as to obtain two centripetal acceleration signals ac1 and ac2; combining the signals ac1 and ac2 so as to obtain a combined signal dependant on only one characteristic of the movement of the drill string and deriving said characteristic from said combined signal.

In accordance with the invention, the instantaneous rotation speed S of the drill string is obtained by adding the signals ac1 and ac2 so as to compensate for the lateral shocks on the drill string and the instantaneous rotation speed S is derived from the signal (ac1+ac2).

The lateral shock on the drill string can also be determined by measuring the centripetal accelerations of the drill string at the four opposite ends of two perpendicular drill string diameters in the same cross-section of the drill string, so as to obtain two centripetal acceleration signals ac1 and ac2 for one diameter and ac3 and ac4 for the other diameter. Then the values (ac1−ac2) and (ac3−ac4) are calculated so as to compensate for the instantaneous rotation speed, and the amplitude and direction of the lateral shock are derived from the calculated values.

The invention also relates to an appparatus for determing the instantaneous rotation speed of a drill string or for determining the lateral shocks on a drill string, the apparatus comprising two or four accelerometers having a DC response to allow the centripetal acceleration to be measured.

An important application of the invention is to transform drill string rotation speed dependent data acquired versus time with a constant sampling time increment $T_c$ separating successive data, into compensated data which would be obtained for a substantially constant drill string rotation speed $S_c$. The compensated data are obtained either by adjusting the constant sampling time interval $T_c$ into a variable sampling time increment $T_v$, using the measured instantaneous rotation speed $S$, or by selecting the data which have been acquired during periods of time during which the instantaneous rotation speed of the drill string varied within predetermined limits only.

In order that features and advantages of the present invention may be further understood and appreciated, the following examples are presented, with reference to the accompanying drawings, in which;

FIG. 1 is a schematic view of a drilling rig with a drill string equipped with a measurement while drilling system;

FIG. 2 shows a cross-section of the drill string equipped with accelerometers and the forces generated by the rotation of the drill string;

Figure 5A:
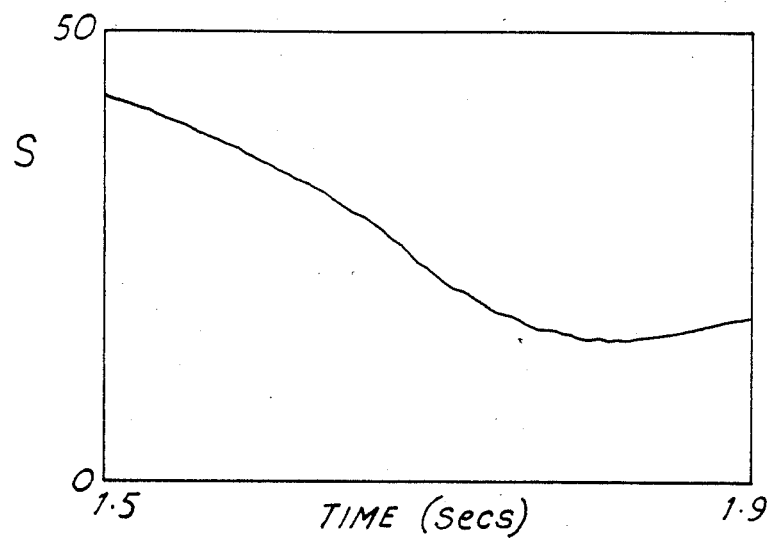
Figure 5B:
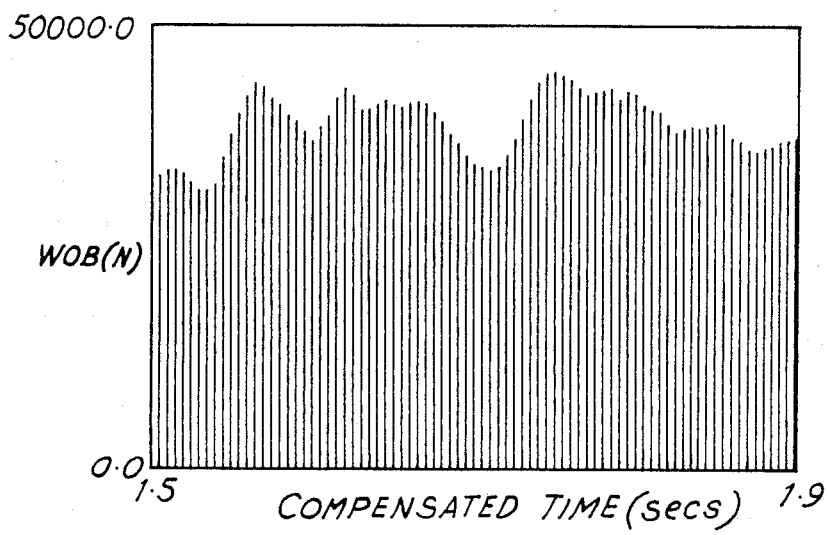

FIGS. 4(a)-4(d) illustrate the method of altering the sample time spacing to compensate for the rotary speed fluctuation;

FIGS. 5(a) and 5(b) represent experimental data which have beencompensated as illustrated in FIG. 4.

FIGS. 6(a)-6(c) represent spectra of the weight on the drilling bit versus frequency, obtained for a constant rotary speed, a fluctuating rotary speed and the compensated spectra, respectively.

Turning now to FIG. 1, an apparatus suitable for performing a method according to a preferred embodiment of the invention includes a measurement while drilling (MWD) tool 10 dependantly coupled to the end of a drill string 12 and a plurality of tandemly connected joints 14 of drill pipes. The drill string 12 is rotated by a rotary table 16 geared to a motor 17, on a conventional drilling rig 18 at the surface. Mud is circulated through the drill string 12 and drill bit 20 and back to the surface in the annular space 22 delimited between the drill string 12 and the wall 24 of the borehole. The circulating mud stream flowing through the drill string 12 may serve, if desired, as a medium for transmitting pressure pulse signals carrying information from the MWD tool 10 to the surface. These acoustic signals are converted to electrical signals by a transducer 26 at the surface. The electrical signals are analysed by appropriate data processing means 28 at the surface.

In accordance with the present invention, the MWD tool comprises on the sub 30 which is immediately above the drill bit 20, at least one pair of accelerometers 32 and 34 or 36 and 38 (see FIG. 2). The accelerometers 32 and 34 or 36 and 38 are mounted at the opposite ends of a tool diameter (in the same cross-section) as shown in FIG. 2. The sub 30 on which the accelerometers are mounted being a cylinder, a cross-section perpendicular to the axis of the cylinder is a circle (indicated as 30 on FIG. 2). Preferentially, the tool comprises four accelerometers which are mounted at the opposite ends of two perpendicular diameters. In other words, the four accelerometers are mounted in the same cross-section of the sub 30, cross-section perpendicular to the longitudinal axis 40 of the MWD tool, the accelerometers being angularly spaced by 90° from each other. The accelerometers are of the type delivering a DC component such as piezoresistive accelerometers for example. A suitable type of accelerometer is one which employs either a fully active or half active Wheatstone bridge consisting of semiconductor strain gauges. The strain gauges are bonded to a simple cantilever beam which is end loaded with a mass. Under acceleration, a force is created on the cantilever, resulting in a bending moment to the beam. This moment creates a strain, proportional to the acceleration, which results in an unbalance of the Wheatstone bridge. This unbalance provides a signal at the bridge output which is proportional to the acceleration vector. This type of accelerometer is, for example, supplied by the company Entran Devices Inc, in Fairfield, N.J.

The accelerometers used in the present invention are for measuring the centripetal acceleration of the drill bit 20. Only the DC components of the signals delivered by the accelerometers are of interest for the measurement of the instantaneous rotation speed in accordance with the present invention.

Electrical power is provided in the MWD tool by a typical rotatably driven axial flow mud turbine 42 which has an impeller 44 responsive to the flow of drilling mud that drives a shaft 46 to produce electrical energy. An encoder 52 sequentially produces encoded digital data electrical signals representative of the measurements obtained by the accelerometers 32 to 38.

The MWD tool also includes a modulator 48 which is driven by a motor 50 to selectively interrupt or obstruct the flow of the drilling mud through the drill string in order to produce digitally encoded pressure pulses in the form of acoustic signals. The modulator 48 is selectively operated in response to the data encoded electrical output of the encoder 52 to generate a correspondingly encoded acoustic signal. This signal is transmitted to the well surface by way of the fluid flowing in the drill string as a series of pressure pulse signals which preferably are encoded binary representations of measurement data indicative of the downhole instantaneous rotation speed of the drill bit or the lateral shocks on it.

The modulator 48 includes a stator 54 and a rotor 56 which is driven by the motor 50 in response to signals generated by the encoder 52. Rotation of the rotor 56 is controlled in response to the data encoded electrical output of the encoder 52 in order to produce a correspondingly encoded acoustic output signal. This can be accomplished by applying well known techniques to vary the direction or speed of the motor 50 or to controllably couple/uncouple the rotor 56 from the drive shaft of the motor 50.

The illustration of the invention in FIG. 1 is for measuring the instantaneous rotation speed of the drill bit 20 and the lateral shocks exerted on the bit. However, the invention can be used to determine the instantaneous rotation speed of any part of the drill string and the lateral shocks exerted on it such as, for example, at the surface at proximity of the rotary table 16.

The accelerometers used in the present invention must have a frequency response down to a DC component to allow the centripetal acceration ac of the sub 30 to be measured. Looking at FIG. 2, the signals delivered by the four accelerometers 32 to 38 are respectively ac1, ac2, ac3 and ac4. Contributing to the amplitude of each signal are the centripetal acceleration ac to be determined and the lateral shocks on the sub 30. Assuming a lateral shock of amplitude ax and of direction determined by the angle d formed by the ac1/ac2 axis and the shock direction ax, the following equations can be written:

ac1 = ac + ax cos d ac2 = ac − ax cos d ac3 = ac + ax sin d ac4 = ac − ax sin d

To determine the instantaneous rotation speed, only one pair of opposite accelerometers is needed. Assuming accelerometers 32 and 34 are used, the signals ac1 and ac2 are added to eliminate lateral shocks ax which are common to both accelerometers. This also eliminates the gravitational component in case the sub 30 would not be vertical. From the above expressions of ac1 and ac2 the following equation is obtained:

$$\frac{ac1 + ac2}{2} = ac = rf^2$$

wherein r is the distance of the accelerometers to the longitudinal axis 40 of the tool (ie radius of circle 30) and f is the angular frequency. The instantaneous rotation speed S, expressed in rotation per minute, is equal to:

$$S = \frac{60f}{2\text{Pi}}$$

wherein Pi is the ratio of the circumference of a circle to its diameter. The instantaneous rotation speed S in rotation per minute is therefore equal to:

$$S = \frac{60}{2\text{Pi}} \left( \frac{ac1 + ac2}{2r} \right)^{\frac{1}{2}}$$

The signals ac1 and ac2 from the transducers 32 and 34 have been used in the above equations. However, the signals from the accelerometers 36 and 38 could be used as well and the instantaneous rotation speed S derived from the signals ac3 and ac4.

Measurement of the lateral shock component along the accelerometer axis could be achieved with the FIG. 2 configuration by monitoring the root mean square and/or peak values of the quantity (ac1−ac2)/2. However, this measurement can be significantly improved by employing two additional accelerometers 36 and 38 positioned at 90° to the accelerometers 32 and 34 so that centripetal acceleration is measured at the ends of two orthogonal diameters. In this way the true shock amplitude ax and direction d could be resolved by the following equations:

$$ax = \left[ \left( \frac{ac1 - ac2}{2} \right)^2 + \left( \frac{ac3 - ac4}{2} \right)^2 \right]^{\frac{1}{2}}$$

$$\tan d = \frac{ac3 - ac4}{ac1 - ac2}$$

These additional measurements could be particularly useful as it would be possible to record the cumulative shocks in a given direction. If there is some bias to the measured direction this could give an early indication of deviation tendency for the drill bit.

Figure 3:
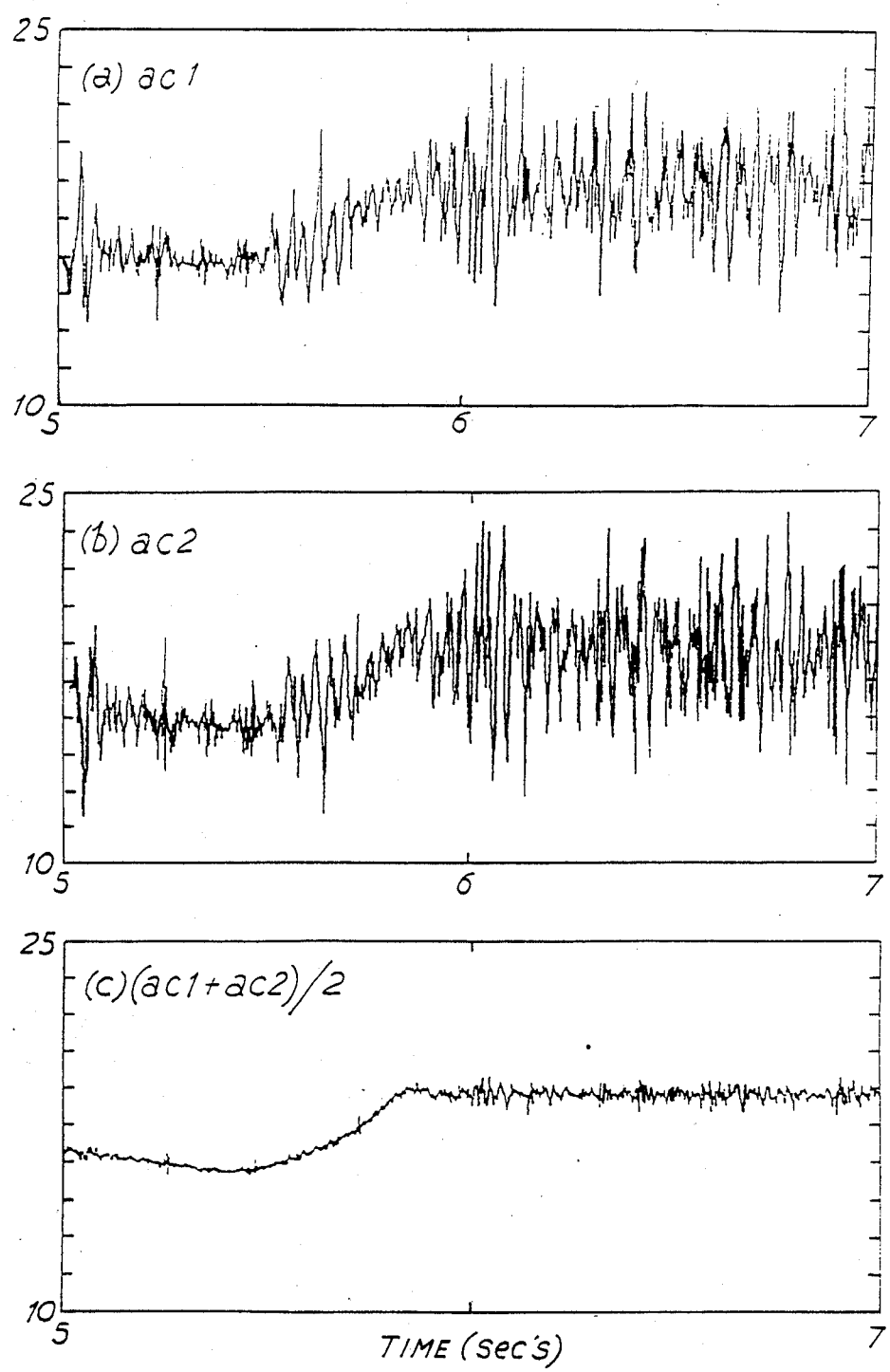
FIG. 3 shows the signals generated by two accelerometers located at the opposite ends of a drill string diameter and the signal resulting from the removal of the lateral shocks.

FIG. 3 represents the signals ac1 (FIG. 3a) and ac2 (FIG. 3b) of two accelerometers mounted at the opposite ends of a diameter of a shaft supporting a drill bit in a laboratory machine. The machine was used to continue drilling a slate sample into which a guide hole with poor gauge integrity had previously been drilled. This arrangement assured a relatively high level of lateral shocks. Rotary speed variation was introduced by interruption of the power supply feeding the motor driving the drill bit for about 1 second at about 2.3 second intervals to produce fluctuations on the same time scale as the fundamental drill string torsional mode at a depth of about 1200 meters. Although the shaft did not actually stop with the system, the speed variation was typically between 30 and 85 rotations per minute. The outputs ac1 and ac2 (in m/s$^2$) versus time (in seconds) from the two radially mounted accelerometers are shown in FIGS. 3a and 3b and the combined signal (ac1+ac2)/2 is shown in FIG. 3c. It is noted that lateral shocks produce signals of opposite phase from the radial accelerometers so the combined output of FIG. 3c gives a clear estimate of centripetal acceleration. The lateral shock level in this case was about 12 m/s$^2$ with a centripetal acceleration of 10.5 m/s$^2$ for a steady state rotary speed of 86 rotations per minute. The residual high frequency noise in FIG. 3c can easily be removed with a low pass filter.

An important application of the measurement of the drill bit instantaneous rotation speed is to transform data acquired versus time with a constant sampling rate increment $T_c$ separating successive data, into compensated data which would be obtained for a substantially constant drill string rotation speed $S_c$. In many measurements made downhole, for example the weight or the torque applied on the bit, digitized samples from the signal of interest are obtained at equispaced time increments. However, if the instantaneous rotation speed of the drill bit varies, the measurements correspond to different and variable angular positions of the rotating drill bit. For certain applications, such as the study of the vibrations generated by the drill bit, it is required to adjust the sampling the increment so that the data are effectively sampled as a function of the drill bit angular position. After adjustment of the time increment, the data represent that which would be obtained if the bit was rotating at a constant instantaneous rotation speed. When this has been achieved, then comparison between different data, for example comparison of spectra of vibrations generated by the drill bit, can be made.

The method of transforming the data is illustrated in FIGS. 4(a)–4(d). The signal of interest, weight on bit for example, is sampled at a constant frequency so that two consecutive samples are separated by a constant time interval $T_c$ (FIG. 4a). For the sake of clarity it is assumed here that the data were acquired at a frequency of 1 Hz. The time interval $T_c$ is therefore constant and equal to 1 second. This corresponds on FIG. 4a to the data A, B, C . . . , I. However, as shown in FIG. 4b, the instantaneous rotation speed S varied from 60 rotations per minute to 20 rotations per minute during the first four seconds, then was stabilized at 20 rotations per minute during the next two seconds and then increased up to 40 rotations per minute during the following two seconds. In accordance with the invention, the instantaneous rotation speed measurement is used to adjust the constant time increment $T_c$ into a variable time interval $T_v$ (FIG. 4c) so that the resulting compensated data correspond to equal increments of drill bit angle. The compensated data are that which would be obtained for a constant drill bit rotation speed $S_c$. Each variable sampling time increment $T_v$ is determined by:

$$T_v = \frac{S}{S_c} T_c$$

S and $S_c$ being respectively the measured instantaneous rotation speed and the constant instantaneous rotation speed.

The adjustment of time increment is illustrated on FIG. 4c wherein it has been assumed that the constant instantaneous rotation speed $S_c$ would be equal to 60 rotations per minute. The first variable time interval $T_v$ between data A and B becomes 5/6ths of a second since the instantaneous rotation speed went from 60 to 50 rotations per second. The new data A' and B' are therefore obtained. The variable time interval $T_v$ between data B and C is now 4/6ths of a second since the instantaneous rotation speed for data C was 40. The new data C' is so obtained. For each data A, B, C, . . . , I, a variable time interval $T_v$ is computed so as to obtain the compensated data A', B', C', . . . , I'. In the example of FIG. 4(c), the variable time intervals $T_v$ have the successive values: 5/6, 4/6, 3/6, 2/6, 2/6, 2/6, 3/6 and 4/6.

FIGS. 5a and 5b represents respectively the recording of the instantaneous rotation speed of a drill bit during a time interval t=1.5 s to t=1.9 s, and the compensated data of weight on bit during the same time interval. FIG. 5 is an example of true weight on bit data acquired with a laboratory equipment.

The curve or function represented by the compensated data A', B', . . . , I' is then sampled with a constant time interval $T'_c$ as shown in FIG. 4d so as to obtain the equispaced data points, in angular increments, to allow the application of Fast Fourier Transform based algorithms. This application, for example, in a method of analysing the vibrations from a drilling bit such as described in U.S. Pat. No. 4,773,263 and in the co-pending GB patent application No. 8807889 filed 17 June 1988. These documents relate to a method for determining the state of wear on a drill bit. The vibrations generated by the working drill bit are detected and converted into a time oscillatory signal from which a frequency spectrum is derived. In the case of a multicone drill bit, the rate of rotation of at least one cone is determined and the state of wear of the drill bit is derived from the rate of cone rotation. To obtain a vibration spectrum which is independent of the bit rotation speed, the spectrum is normalised by adjusting the frequency increment so that the spectrum would be equivalent to that obtained at a predetermined bit rotation speed. However, in these documents the spectra are normalised with the average bit rotation speed, and not with the instantaneous rotation speed. The transformation of the weight on bit signal versus time into spectra as a function of frequency is achieved by applying Fast Fourier Transform algorithms.

FIGS. 6(a)–6(c) shows three spectra respresenting the square of the amplitude of weight on bit versus frequency (in Hz). These spectra have been obtained by measuring the longitudinal vibrations produced by a milled tooth drill bit on which a 50 kN weight on bit was applied while drilling a sample of Delabole slate.

FIG. 6a represents the spectrum obtained at constant rotation speed of the drill bit and FIG. 6b is the spectrum obtained with a fluctuating rotation speed. Simultaneously with the recording of the weight on bit in the case of FIG. 6b, the instantaneous rotation speed was measured. The weight on bit data acquired versus time, from which the spectrum of FIG. 6b was derived, were compensated to adjust the constant time increment with the instantaneous rotation speed measurement, as explained previously, "normalizing" the data to a constant rotation speed of the drill bit equal to the one of FIG. 6a. Compensate weight on bit data versus time were obtained, with a variable time increment $T_v$ (as illustrated in FIG. 4). Then the compensated data were sampled with a constant time increment $T'_c$ (as illustrated on FIG. 4d). From these compensated data, the spectrum of FIG. 6c was obtained. The spectra of FIG. 6a and FIG. 6c can now be compared since both relate to the same constant instantaneous rotation speed of the drill bit. The positions of the maximum peaks are used to determine the rotation speed of individual cones of the drill bit. A good agreement is noted between the positions of these peaks in the spectrum obtained from the compensated data (FIG. 6c) and the one obtained during constant rotary speed (FIG. 6a). Similar cone speed estimates can therefore be obtained. It is apparent that this peak detection method would fail to give a correct cone speed estimate in the uncompensated spectrum of FIG. 6b.

An alternative approach to avoid problems from fluctuating rotation speed of the drill bit is to obtain spectra only from data which conforms to pre-specified fluctuation limits of the rotation speed. The measurements of the instantaneous rotation speed are therefore used to select suitable segments of data acquired during time intervals corresponding to an instantaneous rotation speed having varied within predetermined limits. Preferentially, the instantaneous rotation speed is substantially constant.

We claim:

1. A method of determining at least one characteristic of the movement of a rotating drill string in a borehole, said method comprising the steps:
   (a) measuring the centripetal acceleration of the drill string at at least two opposite ends of a drill string diameter so as to obtain two centripetal acceleration signals ac1 and ac2;
   (b) combining said signals ac1 and ac2 so as to obtain a combined signal dependent on only one characteristic of said movement of said drill string; and
   (c) deriving said characteristic from said combined signal.

2. The method in accordance with claim 1 wherein the instantaneous rotation speed S of the drill string is obtained, characterized in that the signals ac1 and ac2 are added so as to compensate for the lateral shocks on the drill string and the instantaneous rotation speed S is derived from the signal (ac1+ac2).

3. The method in accordance with claim 2 wherein the instantaneous rotation speed S expressed in rotation per minute is determined from the equation:

$$S = \frac{60}{2Pi} \left( \frac{ac1 + ac2}{2r} \right)^{\frac{1}{2}}$$

wherein r is half of said diameter of said drill string and Pi is the ratio of the circumference of a circle to its diameter.

4. The method in accordance with claim 1 wherein the lateral shock on the drill string is determined by measuring the centripetal acceleration of the drill string at four opposite ends of two perpendicular drill string diameters so as to obtain two centripetal acceleration signals ac1 and ac2 for one diameter and ac3 and ac4 for the other diameter; computing the values (ac1−ac2) and (ac3−ac4) so as to compensate for the instantaneous rotation speed; and deriving the amplitude of the lateral shock by the equation:

$$ax = \left[\left(\frac{ac1-ac2}{2}\right)^2 + \left(\frac{ac3-ac4}{2}\right)^2\right]^{\frac{1}{2}}$$

5. The method in accordance with claim 4 wherein the direction of said lateral shock is determined by:

$$\tan d = \frac{ac3-ac4}{ac1-ac2}$$

6. An apparatus for determining at least one characteristic of the movement of a rotating drill string, said apparatus comprising:
  (a) means for measuring the centripetal acceleration of said drill string at at least two opposite ends of a drill string diameter, thereby obtaining two centripetal acceleration signals ac1 and ac2;
  (b) means for combining said signals ac1 and ac2 so as to obtain a combined signal dependent on only one characteristic of said movement of said drill string; and
  (c) means for deriving said characteristic from said combined signal.

7. The apparatus in accordance with claim 6 wherein said at least one characteristic is the instantaneous rotation speed of said drill string, and wherein said centripetal acceleration measuring means comprises two accelerometers exhibiting a DC response to allow said centripetal acceleration to be measured and positioned at opposite ends of a drill string diameter.

8. The apparatus in accordance with claim 6 wherein said at least one characteristic is the lateral shock on said drill string, and wherein said centripetal acceleration measuring means comprises four accelerometers exhibiting a DC response to allow said centripetal acceleration to be measured and positioned at opposite ends of two perpendicular drill string parameters.

9. Application of the method of claim 1 or 2 to transform data acquired versus time with a constant sampling time increment Tc separating two successive data, into compensated data which would be obtained for a substantially constant drill string rotation speed $S_c$, characterized by adjusting the constant sampling time interval $T_c$ into a variable sampling time increment $T_v$ determined by:

$$T_v = \frac{S}{S_c} T_c$$

wherein S is the instantaneous rotation speed.

10. Application of the method of claim 1 or 2 to transform data acquired versus time with a constant sampling time increment Tc separating two successive data into compensated data which would be obtained for a substantially constant drill string rotation speed $S_c$, characterized by selecting the data which have been acquired during periods of time during which the instantaneous rotation speed of the drill string varied within predetermined limits only.

11. Application of the method of claim 10 wherein the rotation speed is substantially constant during said periods of time.

12. Application of the method of claim 9 characterized in that the data acquired are the weight on a rollercone drill bit, the compensated data being the ones which would be obtained for a substantially constant drill bit rotation speed, and the compensated data are analyzed to determine the working condition of the drill bit.

* * * * *